United States Patent
Kang et al.

(10) Patent No.: US 10,090,492 B2
(45) Date of Patent: Oct. 2, 2018

(54) BATTERY CELL WITH SAFETY IMPROVED USING INERT PARTICLES

(71) Applicant: LG Chem, Ltd., Seoul (KR)

(72) Inventors: Jung Koo Kang, Daejeon (KR); Jin Soo Lee, Daejeon (KR); Joo Hwan Sung, Daejeon (KR); Sung Pil Yoon, Daejeon (KR); Seong Min Kim, Daejong (KR); Ju Bin Kim, Daejeon (KR); Hae Jin Lim, Daejeon (KR); Seunghe Woo, Daejeon (KR)

(73) Assignee: LG Chem, Ltd. (KR)

( * ) Notice: Subject to any disclaimer, the term of this patent is extended or adjusted under 35 U.S.C. 154(b) by 106 days.

(21) Appl. No.: 15/109,335

(22) PCT Filed: Jan. 5, 2015

(86) PCT No.: PCT/KR2015/000059
§ 371 (c)(1),
(2) Date: Jun. 30, 2016

(87) PCT Pub. No.: WO2015/105304
PCT Pub. Date: Jul. 16, 2015

(65) Prior Publication Data
US 2016/0322611 A1    Nov. 3, 2016

(30) Foreign Application Priority Data

Jan. 13, 2014 (KR) .................. 10-2014-0003860
Apr. 10, 2014 (KR) .................. 10-2014-0042791

(51) Int. Cl.
*H01M 2/02*      (2006.01)
*H01M 4/04*      (2006.01)
(Continued)

(52) U.S. Cl.
CPC ....... *H01M 2/0275* (2013.01); *H01M 2/0217* (2013.01); *H01M 4/0404* (2013.01);
(Continued)

(58) Field of Classification Search
CPC ............. H01M 2/0212; H01M 2/1061; H01M 2/1094; H01M 10/0413; H01M 10/0431;
(Continued)

(56) References Cited

U.S. PATENT DOCUMENTS

2005/0130044 A1    6/2005   Aoshima et al.
2005/0221185 A1   10/2005   Sakata et al.
(Continued)

FOREIGN PATENT DOCUMENTS

JP      2003132936 A   *   5/2003
JP      2011210736 A      10/2011
(Continued)

OTHER PUBLICATIONS

International Search Report from PCT/KR2015/000059, dated Apr. 7, 2015.

*Primary Examiner* — Muhammad S Siddiquee
(74) *Attorney, Agent, or Firm* — Lerner, David, Littenberg, Krumholz & Mentlik, LLP

(57) ABSTRACT

Disclosed herein is a battery cell having an electrode assembly mounted in a variable cell case in a state in which the electrode assembly is impregnated with an electrolyte, the battery cell being configured to be flexibly deformed in response to the shape of a device, in which the battery cell is mounted, wherein an uppermost end electrode and/or a lowermost end electrode of the electrode assembly in the direction in which electrodes are stacked is provided on an electrode current collector thereof, facing the inner surface of the cell case, with an electrode mixture including inert particles, 10 to 100% of the inert particles being distributed
(Continued)

on the surface of the electrode mixture such that a concave-convex structure is formed in the surface of the electrode mixture in vertical section.

33 Claims, 8 Drawing Sheets

(51) Int. Cl.
    *H01M 4/62*     (2006.01)
    *H01M 10/0525*     (2010.01)
    *H01M 4/13*     (2010.01)
    *H01M 10/04*     (2006.01)
    *H01M 10/052*     (2010.01)
    *H01M 10/0585*     (2010.01)

(52) U.S. Cl.
    CPC ............... *H01M 4/13* (2013.01); *H01M 4/62* (2013.01); *H01M 4/622* (2013.01); *H01M 10/0436* (2013.01); *H01M 10/0525* (2013.01); *H01M 10/052* (2013.01); *H01M 10/0585* (2013.01)

(58) Field of Classification Search
    CPC .......... H01M 4/62; H01M 4/139; H01M 4/13; H01M 4/04; H01M 2/30; H01M 2/18; H01M 2/1653; H01M 2/1646; H01M 2/06; H01M 2/0287; H01M 2/0267; H01M 2/0262; H01M 2/026; H01M 2/0237; H01M 2/0217; H01M 2/0275; H01M 2220/20; H01M 2220/30; H01H 2220/10

See application file for complete search history.

(56) References Cited

U.S. PATENT DOCUMENTS

| | | | | |
|---|---|---|---|---|
| 2008/0206636 A1* | 8/2008 | Sanada | ................... | H01M 2/00 429/185 |
| 2009/0305141 A1* | 12/2009 | Lee | ......................... | H01M 4/02 429/232 |
| 2010/0261047 A1* | 10/2010 | Kim | .................... | H01M 2/0275 429/144 |
| 2013/0084487 A1 | 4/2013 | Kwak et al. | | |
| 2013/0216896 A1* | 8/2013 | Kim | .................... | H01M 2/0275 429/163 |

FOREIGN PATENT DOCUMENTS

| | | |
|---|---|---|
| KR | 20040054201 A | 6/2004 |
| KR | 20080010733 A | 1/2008 |
| KR | 20100025968 A | 3/2010 |
| KR | 20130035129 A | 4/2013 |

\* cited by examiner

[FIG. 1]
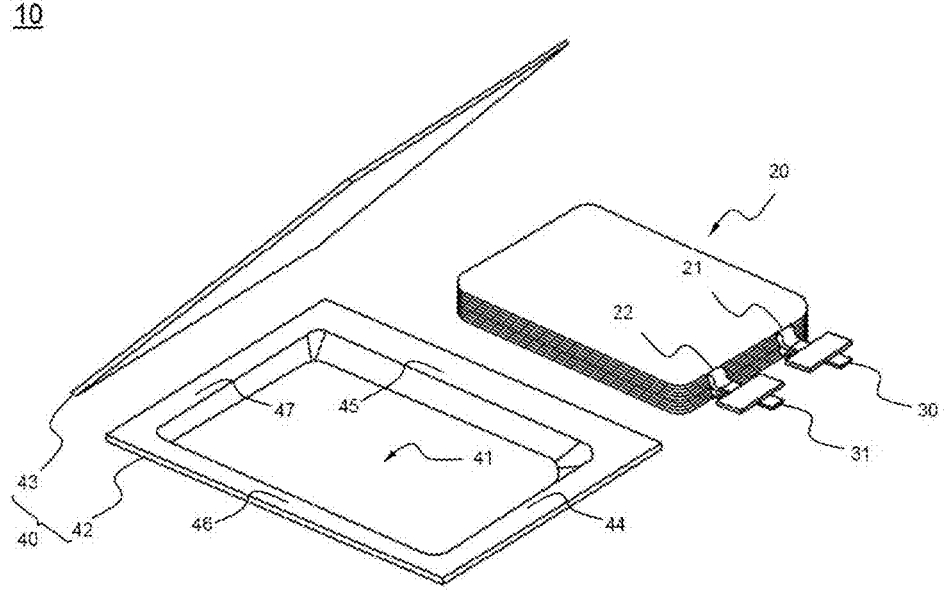

[FIG. 2]
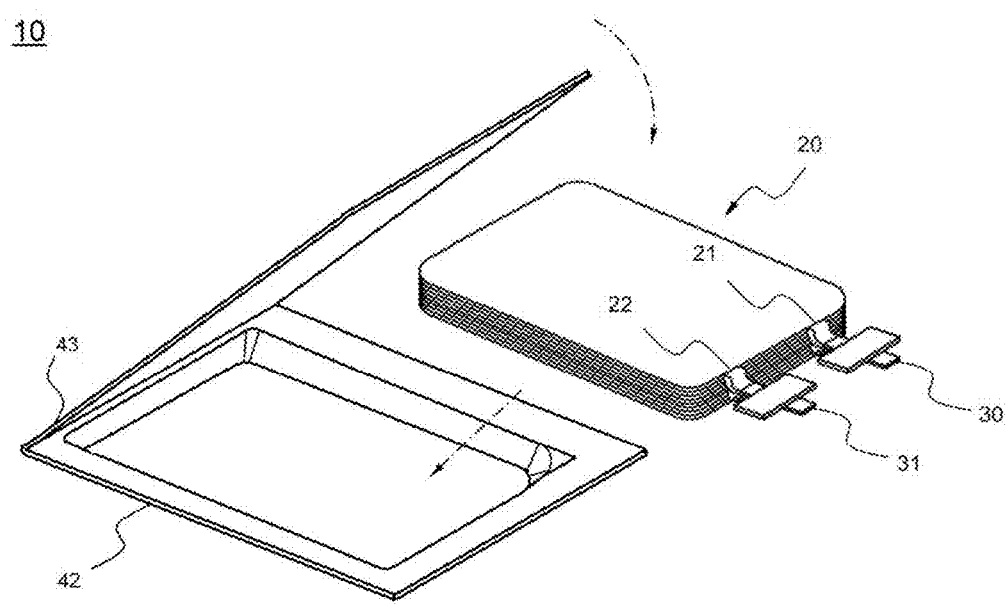

[FIG. 3]
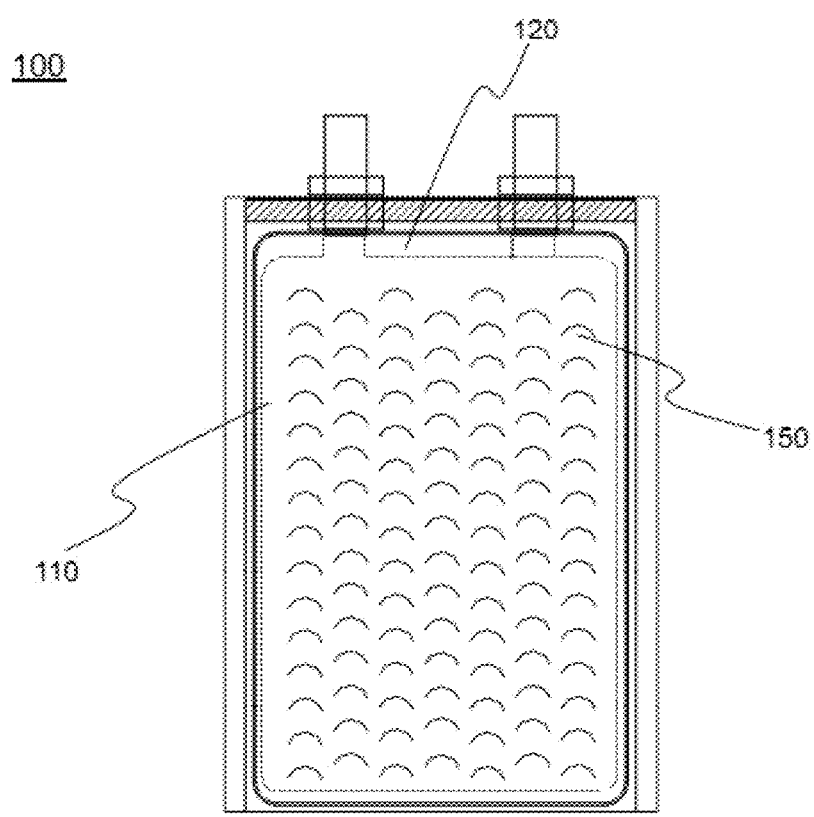

[FIG. 4]
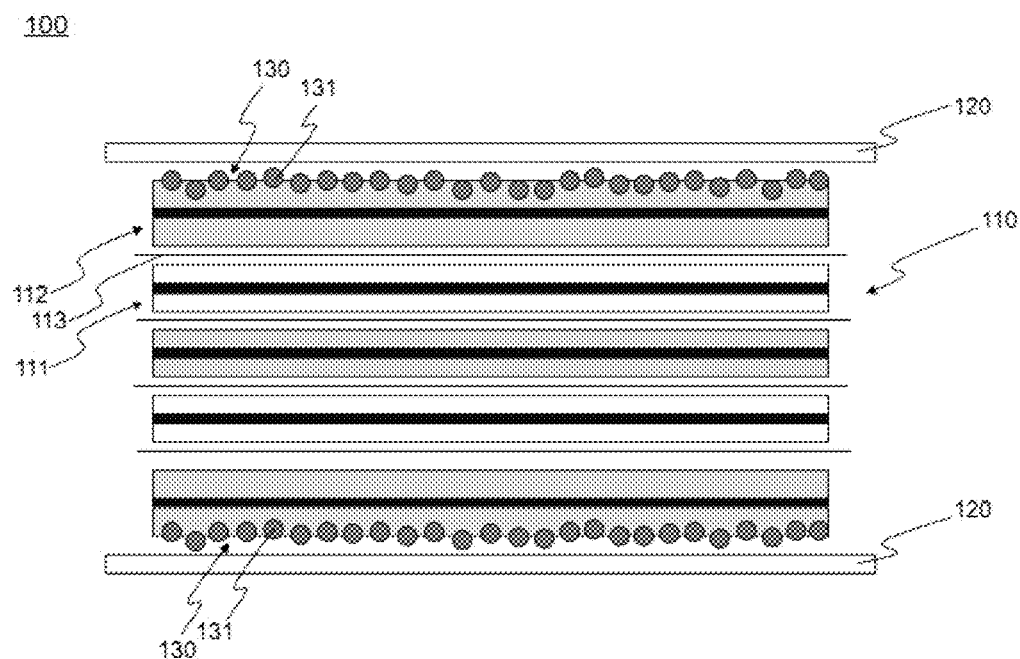

[FIG. 5]
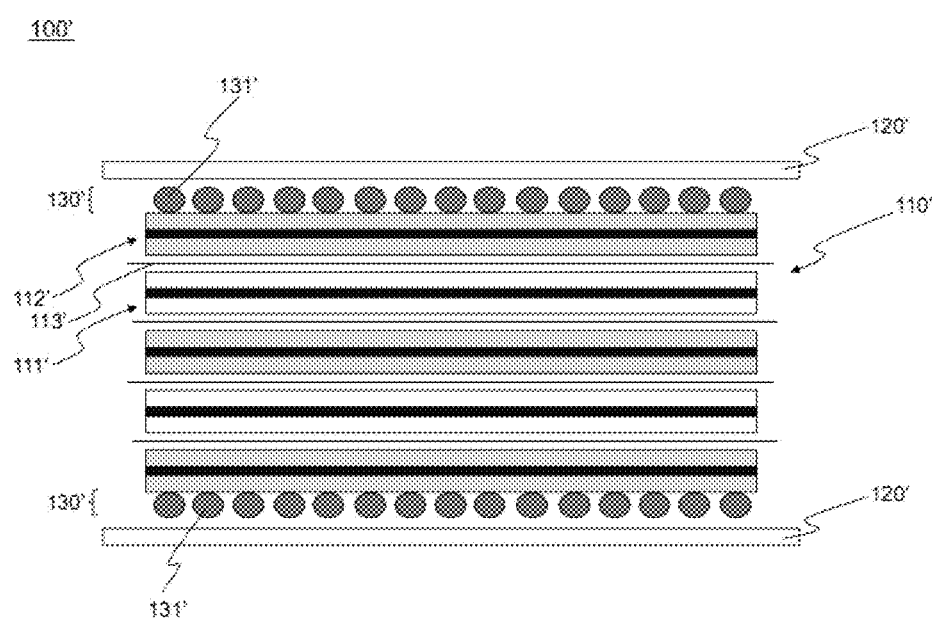

[FIG. 6]
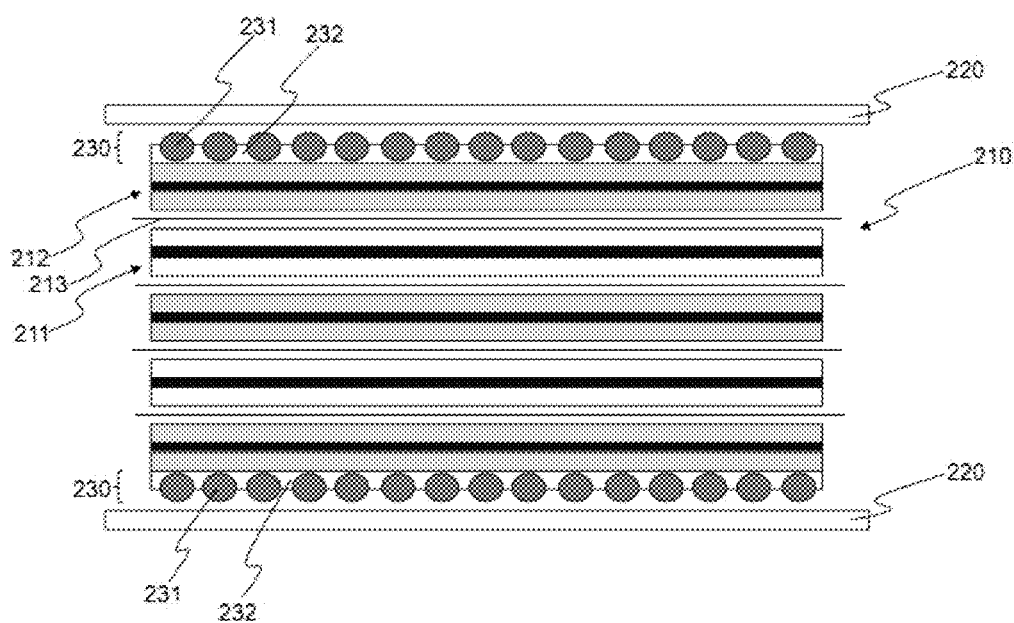

[FIG. 7]
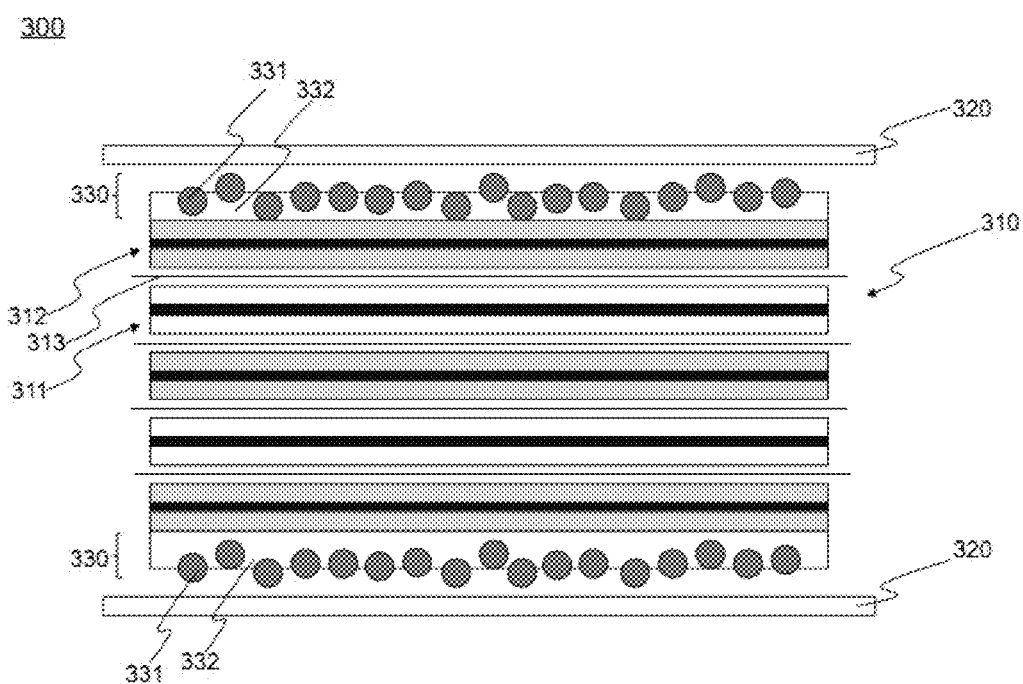

[FIG. 8]
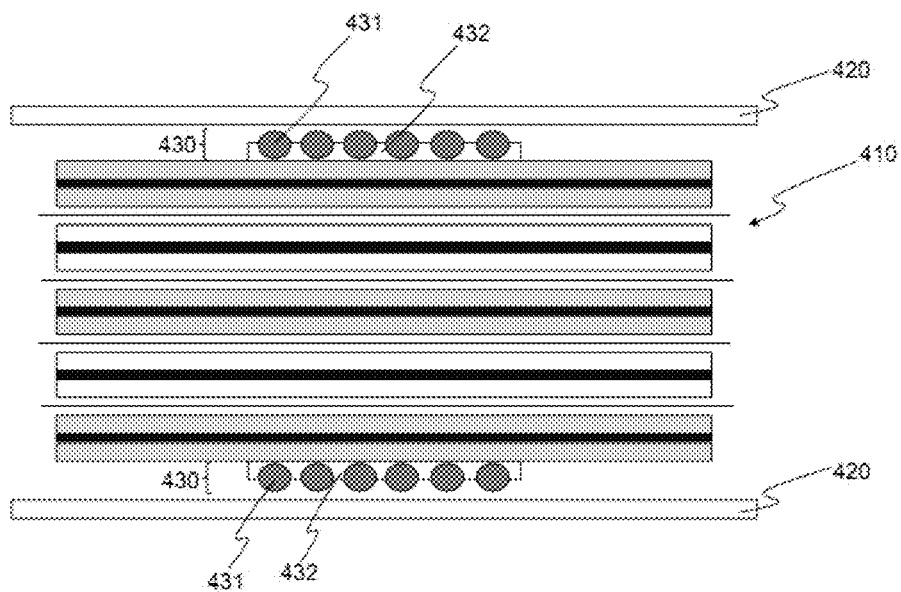

BATTERY CELL WITH SAFETY IMPROVED USING INERT PARTICLES

CROSS-REFERENCE TO RELATED APPLICATION

This application is a national phase entry under 35 U.S.C. § 371 of International Application No. PCT/KR2015/000059, filed Jan. 5, 2015, which claims priority to Korean Patent Application No. 10-2014-0003860, filed Jan. 13, 2014 and Korean Patent Application No. 10-2014-0042791, filed Apr. 10, 2014, the disclosures of which are incorporated herein by reference.

TECHNICAL FIELD

The present invention relates to a battery cell with safety improved using inert particles.

BACKGROUND ART

With remarkable development of information technology (IT), a great variety of portable information communication devices has been popularized. As a result, in the $21^{st}$ century, we are moving toward a ubiquitous society in which high-quality information service is possible regardless of time and place.

Lithium secondary batteries are very important to realize such a ubiquitous society. Specifically, lithium secondary batteries, which can be charged and discharged, have been widely used as an energy source for wireless mobile devices. In addition, the lithium secondary batteries have also been used as an energy source for electric vehicles and hybrid electric vehicles, which have been proposed to solve problems, such as air pollution, caused by existing gasoline and diesel vehicles using fossil fuel.

As devices, to which the lithium secondary batteries are applicable, are diversified as described above, the lithium secondary batteries have also been diversified such that the lithium secondary batteries can provide outputs and capacities suitable for devices to which the lithium secondary batteries are applied. In addition, there is a strong need to reduce the size and weight of the lithium secondary batteries.

Based on the shape thereof, the lithium secondary batteries may be classified into a cylindrical battery cell, a prismatic battery cell, and a pouch-shaped battery cell. Among these kinds of lithium secondary batteries, much interest is currently focused on the pouch-shaped battery cell, which can be stacked with high integration, has high energy density per unit weight, can be manufactured at low cost, and can be easily modified.

FIGS. 1 and 2 are exploded perspective views typically showing a general structure of a conventional representative pouch-shaped secondary battery.

Referring to FIG. 1, a pouch-shaped secondary battery 10 includes a stacked type electrode assembly 20 having pluralities of electrode tabs 21 and 22 protruding therefrom, two electrode leads 30 and 31 respectively connected to the electrode tabs 21 and 22, and a battery case 40, in which the stacked type electrode assembly 20 is received in a sealed state such that the electrode leads 30 and 31 are partially exposed outward from the battery case 40.

The battery case 40 includes a lower case 42 having a depressed receiving part 41, in which the stacked type electrode assembly 20 is located, and an upper case 43 for covering the lower case 42 such that the electrode assembly 20 is sealed in the battery case 40. The upper case 43 and the lower case 42 are connected to each other by thermal welding in a state in which the stacked type electrode assembly 20 is mounted therein to form an upper end sealed part 44, side sealed parts 45 and 46, and a lower end sealed part 47.

As shown in FIG. 1, the upper case 43 and the lower case 42 may be configured as separate members. As shown in FIG. 2, on the other hand, one end of the upper case 43 may be integrally formed at a corresponding end of the lower case 42 such that the upper case 43 and the lower case 42 may be hingedly connected to each other.

In addition, as shown in FIGS. 1 and 2, the pouch-shaped battery cell is configured to have a structure in which electrode terminals constituted by the electrode tabs and the electrode leads connected to the electrode tabs are formed at one end of the electrode assembly. Alternatively, a pouch-shaped battery cell configured to have a structure in which electrode terminals are formed at one end and the other end of an electrode assembly may also be manufactured using the above-described method.

Meanwhile, FIGS. 1 and 2 show the pouch-shaped battery cell having the stacked type electrode assembly. Alternatively, a pouch-shaped battery cell having a wound type or jelly-roll type electrode assembly may also be manufactured using the above-described method.

As shown in FIGS. 1 and 2, the pouch-shaped battery cell is generally configured to have an approximately rectangular hexahedral shape.

However, devices, to which the pouch-shaped battery cell is applied, may be configured to have various shapes other than a rectangular hexahedral shape. The devices may even be configured to have a curved shape. For example, sides of a smart phone may be curved so as to be easier to grip, and a flexible display device may be curved or bent. That is, the flexible display device may be manufactured to have various shapes.

In a case in which a battery cell or battery pack configured to have a rectangular hexahedral shape is mounted in a device designed so as to have such curved parts or a device that can be curved, however, the efficiency of utilization of the space in the device may be lowered. In recent years, it has been required for the battery cell to be flexible such that the battery cell can be easily mounted in devices configured to have various kinds of designs.

Therefore, there is a high necessity for technology that is capable of securing the safety of a battery even when the battery is deformed while solving the above problems.

DISCLOSURE

Technical Problem

The present invention has been made to solve the above problems and other technical problems that have yet to be resolved.

As a result of a variety of extensive and intensive studies and experiments to solve the problems as described above, the inventors of the present application have found that, in a case in which a battery cell is configured such that an electrode having an electrode mixture including inert particles applied thereto or an electrode having a coating part including inert particles formed on the outer surface thereof is located at the uppermost end and/or the lowermost end of an electrode assembly in the direction in which electrodes are stacked, it is possible to secure the safety of the battery cell even when the battery cell is deformed in response to devices having various designs. The present invention has been completed based on these findings.

Technical Solution

The above and other objects can be accomplished by the provision of a battery cell configured to have a structure in which a concave-convex structure is formed in the surface of an uppermost end electrode and/or a lowermost end electrode of an electrode assembly in the direction in which electrodes are stacked using inert particles and a concave-convex structure is also formed in a cell case by the inert particles such that the surface area of the cell case is greater than the surface area of each of the electrodes. Even in a case in which the shape of the battery cell is deformed in response to devices having various kinds of designs, therefore, it is possible to prevent unintentional wrinkles from being formed on the cell case. Consequently, it is possible to effectively prevent dielectric breakdown of the battery cell or leakage of the electrolyte from the battery cell due to the exposure of the metal layer which may be caused by damage to the cell case, thereby securing the safety of the battery cell.

In accordance with one aspect of the present invention, there is provided a battery cell having an electrode assembly mounted in a variable cell case in a state in which the electrode assembly is impregnated with an electrolyte, the battery cell being configured to be flexibly deformed in response to the shape of a device, in which the battery cell is mounted, wherein an uppermost end electrode and/or a lowermost end electrode of the electrode assembly in the direction in which electrodes are stacked is provided on an electrode current collector thereof, facing the inner surface of the cell case, with an electrode mixture including inert particles, 10 to 100% of the inert particles being distributed on the surface of the electrode mixture such that a concave-convex structure is formed in the surface of the electrode mixture in vertical section.

The cell case may also have a concave-convex structure, which is formed by the inert particles included in the electrode mixture of the uppermost end electrode and/or the lowermost end electrode of the electrode assembly.

In a concrete example, the electrode mixture including inert particles may be applied to the electrode current collector of the uppermost end electrode or the lowermost end electrode of the electrode assembly. Alternatively, the electrode mixture including inert particles may be applied to the electrode current collector of each of the uppermost end electrode and the lowermost end electrode of the electrode assembly in order to prevent wrinkles from being formed on the cell case and thus to secure the safety of the battery cell even in a case in which the battery cell is flexibly deformed in opposite directions.

The uppermost end electrode or the lowermost end electrode with the above-stated construction may be manufactured by applying and drying an electrode slurry, including an electrode active material, a binder, and inert particles, to the electrode current collector thereof, facing the inner surface of the cell case.

It is necessary for the inert particles included in the electrode slurry to be distributed on the surface of the electrode mixture such that the concave-convex structure is formed in the outer surface of the electrode. The electrode slurry may have a viscosity of 500 to 40000 cps such that the inert particles can move in the electrode slurry to a certain extent. In order for the inert particles having mobility to float on the surface of the electrode after being applied, it is preferable for the specific gravity of the inert particles to be less than the overall specific gravity of the electrode slurry. Specifically, the specific gravity of the inert particles may be 30 to 95% of the overall specific gravity of the electrode slurry.

In a case in which the viscosity of the electrode slurry is less than 500 cps, it is difficult to apply the electrode slurry to the electrode current collector, which is not preferable. On the other hand, in a case in which the viscosity of the electrode slurry is greater than 40000 cps, it is difficult for the inert particles to move in the electrode slurry, with the result that it is difficult for the inert particles to float on the surface of the electrode, which is also not preferable.

In a case in which the specific gravity of the inert particles is less than 30% of the overall specific gravity of the electrode slurry, the inert particles may float on the surface of the electrode slurry, with the result that adhesive force is reduced, which is not preferable. On the other hand, in a case in which the specific gravity of the inert particles is greater than 95% of the overall specific gravity of the electrode slurry, most of the inert particles may be present in the electrode slurry, with the result that it is difficult to sufficiently form a concave-convex structure in the cell case and, even though the concave-convex structure is formed in the cell case, it is not possible to increase the surface area of the cell case such that wrinkles can be effectively prevented from being formed on the cell case, which is also not preferable.

The specific gravity of the inert particles may be reduced using various methods. Specifically, materials constituting the inert particles may be appropriately selected, or a porous particle having pores formed therein may be used as each of the inert particles.

In each of the outermost electrode, most of the inert particles are distributed on the surface of the electrode mixture. As described above, 10 to 100%, specifically 50 to 90%, of the inert particles may be distributed on the surface of the electrode mixture such that the concave-convex structure is formed in the surface of the electrode mixture in vertical section.

In accordance with another aspect of the present invention, there is provided a method of manufacturing the battery cell with the above-stated construction, the method including (a) applying and drying an electrode slurry including inert particles to one major surface of an electrode current collector and applying and drying an electrode slurry including no inert particles to the other major surface of an electrode current collector to prepare one or two outermost electrodes, (b) applying and drying an electrode slurry including no inert particles to opposite major surfaces of an electrode current collector to prepare middle electrodes, (c) locating the outermost electrodes at the uppermost end and/or the lowermost end of an electrode assembly such that an electrode mixture, including the inert particles, of each of the outermost electrodes faces the inner surface of a cell case in a state in which the middle electrodes are disposed between the uppermost end and the lowermost end of an electrode assembly or in a state in which the middle electrodes are not disposed between the uppermost end and the lowermost end of an electrode assembly to constitute the electrode assembly, and (d) placing the electrode assembly in a receiving part of a variable cell case and pressing the cell case such that the cell case comes into tight contact with the electrode assembly.

The electrode assembly is configured by only the outermost electrodes or by the outermost electrodes and the middle electrodes. Specifically, the electrode assembly may be configured by the outermost electrodes and the middle electrodes.

In accordance with another aspect of the present invention, there is provided a battery cell having an electrode assembly mounted in a variable cell case in a state in which the electrode assembly is impregnated with an electrolyte, the battery cell being configured to be flexibly deformed in response to the shape of a device, in which the battery cell is mounted, wherein an uppermost end electrode and/or a lowermost end electrode of the electrode assembly in a direction in which electrodes are stacked is provided on an electrode mixture layer thereof, facing the inner surface of the cell case, with a coating part including inert particles, whereby the battery cell is configured to have a structure in which a concave-convex structure is formed in the surface of the outermost electrode (which means the 'uppermost end electrode' and/or the 'lowermost end electrode').

The cell case may also have a concave-convex structure, which is formed by the inert particles included in the coating part formed on the electrode mixture layer of the uppermost end electrode and/or the lowermost end electrode of the electrode assembly.

In a concrete example, the coating part including inert particles may be formed on the uppermost end electrode or the lowermost end electrode of the electrode assembly. Alternatively, the coating part including inert particles may be formed on each of the uppermost end electrode and the lowermost end electrode of the electrode assembly in order to prevent wrinkles from being formed on the cell case and thus to secure the safety of the battery cell even in a case in which the battery cell is flexibly deformed in opposite directions.

In addition, the coating part including inert particles may be partially or entirely formed on the electrode mixture layer. Specifically, the coating part including inert particles may be entirely formed on the electrode mixture layer. In a case in which the coating part including inert particles is partially formed on the electrode mixture layer, the region of the electrode assembly at which the coating part including inert particles is formed is not particularly restricted. For example, the coating part including inert particles may be formed on a bendable portion of the electrode assembly, on which a plurality of wrinkles may be formed.

The construction of the coating part including inert particles is not particularly restricted. The coating part including inert particles may have the following constructions.

In one example, the coating part including inert particles may be an inert particle layer including inert particles scattered on the electrode mixture layer.

In this case, the coating part is constituted only by the inert particles. The inert particles are regularly or irregularly scattered on the electrode mixture layer such that a concave-convex structure is formed in the outer surface of each of the outermost electrodes facing the inner surface of the cell case.

At this time, the inert particles may be fixed to the electrode mixture layer by a binder included in the electrode mixture layer. Alternatively, a binder may be further coated on the surface of each of the inert particles such that the inert particles can be further appropriately fixed to the electrode mixture layer.

In another example, the coating part including inert particles may include a binder layer formed on the electrode mixture layer and inert particles scattered on the binder layer.

That is, the binder layer may be formed, and then the inert particles may be scattered on the binder layer to form the coating part such that the inert particles can be appropriately fixed to the electrode mixture layer, instead of using the inert particles having the binder coated thereon, as described above.

The binder layer may have a thickness less than the size of each of the inert particles. In a case in which the thickness of the binder layer is greater than the size of each of the inert particles, the inert particles may be submerged or buried in the binder layer, with the result that it is not possible to obtain the effects according to the present invention, i.e. the effects of preventing wrinkles from being formed on the cell case by forming the concave-convex structure in the outer surface of each of the outermost electrodes and also forming the concave-convex structure in the outer surface of the cell case such that that the surface area of the cell case is greater than the surface area of each of the electrodes.

The thickness of the binder layer may be 10 to 95% of the size of each of the inert particles.

In a case in which the thickness of the binder layer is less than 10% of the size of each of the inert particles, the inert particles may not appropriately fixed to the electrode mixture layer, which is not preferable. On the other hand, in a case in which the thickness of the binder layer is greater than 95% of the size of each of the inert particles, the inert particles may be almost buried in the binder layer, with the result that it is difficult to form the concave-convex structure in the cell case and, even though the concave-convex structure is formed in the cell case, it is not possible to increase the surface area of the cell case such that wrinkles can be effectively prevented from being formed on the cell case, which is also not preferable.

In a case in which the thickness of the binder layer is less than the size of each of the inert particles, as described above, the concave-convex structure may be formed in the outer surface of each of the outermost electrodes, irrespective of the specific gravity of the inert particles.

In a further example, the coating part including inert particles may be a mixture layer including inert particles and a binder.

That is, the inert particles and the binder may be mixed and coated to form the coating part such that the inert particles can be appropriately fixed to the electrode mixture layer, instead of using the inert particles having the binder coated thereon or additionally forming the binder layer, as described above.

The mixture layer may have a thickness of 1 to 150 micrometers.

In a case in which the thickness of the mixture layer is less than 1 micrometer, a very small amount of binder is applied to the at least one outer surface of the electrode assembly, with the result that it is difficult to fix the inert particles to the at least one outer surface of the electrode assembly, which is not preferable. On the other hand, in a case in which the thickness of the mixture layer is greater than 150 micrometers, an excessive amount of material is used, which is not economical. In addition, the volume of the coating part including inert particles is increased, with the result that the overall size of the battery cell is increased, whereby spatial efficiency is reduced, which is also not preferable.

In addition, in a case in which the coating part including inert particles is a mixture layer including inert particles and a binder, the inert particles must be located on the surface of the mixture layer such that a concave-convex structure is formed in the outer surface of each of the outermost electrodes. For this reason, it is preferable for the specific gravity of the inert particles to be less than the overall specific gravity of the mixture layer. Specifically, the specific gravity of the inert particles may be 30 to 90% of the overall specific gravity of the mixture layer.

In a case in which the specific gravity of the inert particles is less than 30% of the overall specific gravity of the mixture layer, the inert particles may float on the mixture layer including the binder, with the result that adhesive force is reduced, which is not preferable. On the other hand, in a case in which the specific gravity of the inert particles is greater than 90% of the overall specific gravity of the mixture layer, most of the inert particles may be buried in the mixture layer including the binder, with the result that it is difficult to sufficiently form a concave-convex structure in the outer surface of each of the outermost electrodes such that the concave-convex structure can be formed in the cell case and, even though the concave-convex structure is formed in the cell case, it is not possible to increase the surface area of the cell case such that wrinkles can be effectively prevented from being formed on the cell case, which is also not preferable.

The specific gravity of the inert particles may be reduced using various methods, such as a method of appropriately selecting materials constituting the inert particles and a method of using a porous particle having pores formed therein as each of the inert particles.

In various examples of the coating part, the binder constituting the coating part together with the inert particles is not particularly restricted. The binder constituting the coating part together with the inert particles may be the same as the binder used to form the electrodes. As examples of the binder, there may be used polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

In accordance with another aspect of the present invention, there is provided a method of manufacturing the battery cell with the above-stated construction, the method including (a) applying and drying an electrode mixture to an electrode current collector to prepare a plurality of electrodes, (b) selecting one or two electrodes from among the prepared electrodes and forming a coating part including inert particles on one major surface of an electrode mixture layer of each of the selected electrodes, (c) locating the one or two electrodes, on one major surface of the electrode mixture layer of each of which the coating part including inert particles is formed, at the uppermost end and/or the lowermost end of an electrode assembly such that the coating part faces the inner surface of a cell case to constitute the electrode assembly, and (d) placing the electrode assembly in a receiving part of a variable cell case and pressing the cell case such that the cell case comes into tight contact with the electrode assembly.

The kind of each of the inert particles is not particularly restricted irrespective of the above-described structures. In a concrete example, each of the inert particles may be an organic particle and/or an inorganic particle. Specifically, each of the inert particles may be an organic particle.

The organic particle may be made of, for example, a polymer or a silane-based compound. As examples of the polymer, there may be used PE, PP, PS, PVdF, PTFE, PET, PMMA, and PANdlf. As examples of the silane-based compound, there may be used hexamethyldisilazane (HMDS), trimethylchlorosilane (TMSCL), polydimethylsiloxane (PDMS), and dimethyldichlorosilane (DDS).

The organic particle may be one or a mixture of two or more selected from a group consisting of $SiO_2$, $Al_2O_3$, MgO, $TiO_2$, $ZrO_2$, CaO, $Y_2O_3$, and SrO.

In a case in which each of the inert particles is an inorganic particle, each of the inert particles may be a porous particle having pores formed therein, as previously described, since the specific gravity of the inorganic particle is greater than the overall specific gravity of the electrode slurry or the binder.

In addition, in a concrete example, the shape of each of the inert particles is not particularly restricted so long as each of the inert particles has a predetermined volume. For example, each of the inert particles may be configured to have a spherical shape, an oval shape, or a polyhedral shape. In consideration of the shape of each of the inert particles and easiness in application or scattering of the inert particles, each of the inert particles may have a size of 5 to 1000 micrometers, specifically 5 to 200 micrometers.

An electrode active material, a binder, and a conductive agent included in the electrode mixture are well known in the art to which the present invention pertains, and therefore a detailed description thereof will be omitted. Of course, however, all well-known materials are included in the category of the present invention.

Meanwhile, the cell case may be a pouch-shaped case made of a laminate sheet including a resin layer and a metal layer such that the cell case is flexible so as to be easily mounted in devices having various kinds of designs and has the same concave-convex structure as that formed in the outermost electrodes The laminate sheet may be an aluminum laminate sheet. Specifically, the laminate sheet may be configured to have a structure in which an outer resin layer exhibiting high durability is attached to one major surface (the outer surface) of a metal blocking layer and a resin sealant layer exhibiting a high thermal bonding property is attached to the other major surface (the inner surface) of the metal blocking layer.

It is required for the outer resin layer to exhibit high resistance to external environment. Consequently, it is required for the outer resin layer to exhibit more than predetermined tensile strength and weather resistance. For this reason, the outer resin layer may be made of a polymer resin, such as polyethylene terephthalate (PET) or oriented nylon film.

It is required for the metal blocking layer to have a function of increasing the strength of the battery case in addition to a function of preventing the introduction or leakage of foreign matter, such as gas or moisture. To this end, the metal blocking layer may be made of, for example, aluminum.

The resin sealant layer may be made of a polyolefin resin which exhibits a high thermal bonding property (thermal adhesive property) and a low hygroscopic property, which is necessary to restrain permeation of an electrolyte, and is not expanded or is not corroded by the electrolyte. More specifically, the resin sealant layer may be made of cast polypropylene (CPP).

In general, a polyolefin-based resin, such as polypropylene, has low adhesion with metal. For this reason, an adhesion layer may be further disposed between the resin sealant layer and the metal blocking layer so as to improve adhesion between the resin sealant layer and the metal blocking layer and to improve blocking characteristics. The adhesion layer may be made of, for example, urethane, acryl, or thermoplastic elastomer, to which, however, the material for the adhesion layer is not limited.

In addition, the structure of the electrode assembly, which is mounted in the variable cell case in a state in which the electrode assembly is impregnated with the electrolyte, is not particularly restricted so long as a plurality of electrode tabs is connected to constitute the positive electrode and the negative electrode of the electrode assembly. The electrode assembly may be configured to have a structure in which the outermost electrodes are different in construction from the other electrodes. Specifically, the electrode assembly may be a stacked type electrode assembly, configured to have a structure in which positive electrodes and negative electrodes, each of which has a predetermined size, are sequentially stacked in a state in which separators are disposed respectively between the positive electrodes and the negative electrodes, a stacked/folded type electrode assembly, configured to have a structure in which positive electrodes and negative electrodes, each of which has a predetermined size, are sequentially stacked in a state in which separators are disposed respectively between the positive electrodes and the negative electrodes to constitute a bi-cell or a full cell and then bi-cells or full cells are folded using a separation film, or a laminated/stacked type electrode assembly, configured to have a structure in which bi-cells or full cells are stacked in a state in which separators are disposed respectively between the bi-cells or the full cells.

The bi-cell may be configured to have a stacked structure in which electrodes having the same polarity are located at the opposite sides of the cell. For example, the bi-cell may be a cell including a positive electrode, a separator, a negative electrode, a separator, and a positive electrode or a cell including a negative electrode, a separator, a positive electrode, a separator, and a negative electrode. The full cell may be configured to have a stacked structure in which electrodes having different polarities are located at the opposite sides of the cell. For example, the full cell may be a cell including a positive electrode, a separator, and a negative electrode.

As described above, the electrode mixture or the coating part including inert particles according to the present invention is formed on each of the outermost electrodes, which face the inner surface of the cell case. When the electrode assembly is placed in the receiving part of the variable cell case and the cell case is pressed such that the cell case comes into tight contact with the electrode assembly, therefore, the same concave-convex structure as that formed in the electrode assembly is also formed in the cell case. As a result, the surface area of the cell case is greater than the surface area of each of the electrodes. Even in a case in which the shape of the battery cell is deformed in response to devices having various kinds of designs, therefore, it is possible to maximally prevent unintentional wrinkles from being formed on the cell case.

In accordance with other aspects of the present invention, there are provided a battery module including two or more battery cell with the above-stated construction and a battery pack including the battery module.

In accordance with a further aspect of the present invention, there is provided a device including the battery pack as a power source. The device may be selected from among a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage apparatus.

The structure and manufacturing method of the device are well known in the art to which the present invention pertains, and therefore a detailed description thereof will be omitted.

DESCRIPTION OF DRAWINGS

The above and other objects, features and other advantages of the present invention will be more clearly understood from the following detailed description taken in conjunction with the accompanying drawings, in which:

FIGS. 1 and 2 are exploded perspective views showing a conventional representative pouch-shaped secondary battery;

FIG. 3 is a plan view showing a battery cell according to an embodiment of the present invention;

FIG. 4 is a side view typically showing an internal structure of a battery cell according to an embodiment of the battery cell of FIG. 3;

FIG. 5 is a side view typically showing an internal structure of a battery cell according to another embodiment of the battery cell of FIG. 3;

FIG. 6 is a side view typically showing an internal structure of a battery cell according to another embodiment of the present invention;

FIG. 7 is a side view typically showing an internal structure of a battery cell according to another embodiment of the present invention; and FIG. 8 is a side view typically showing an internal structure of a battery cell according to a further embodiment of the present invention.

BEST MODE

Now, exemplary embodiments of the present invention will be described in detail with reference to the accompanying drawings. It should be noted, however, that the scope of the present invention is not limited by the illustrated embodiments.

FIG. 3 is a plan view showing a battery cell 100 according to an embodiment of the present invention, and FIG. 4 is a side view typically showing an internal structure of a battery cell 100 according to an embodiment of the battery cell 100 of FIG. 3.

Referring to these figures, the battery cell 100 according to the present invention is configured to have a structure in which an electrode assembly 110, including positive electrodes 111, negative electrodes 112, and separators 113 disposed respectively between the positive electrodes 111 and the negative electrodes 112, is mounted in a pouch-shaped case 120 in a state in which the electrode assembly 110 is impregnated with an electrolyte, and the uppermost end electrode and the lowermost end electrode of the electrode assembly 110 in the direction in which the electrodes are stacked, are provided with electrode mixtures 130, each of which includes inert particles 131, facing the inner surface of a pouch-shaped case 120.

As shown in FIG. 4, most of the inert particles 131 are distributed on the surfaces of the electrode mixtures 130. Consequently, when the electrode assembly 110, which is configured such that the electrode mixtures 130, including the inert particles 131, face the inner surface of the pouch-shaped case 120, is mounted in the pouch-shaped case 120 and the pouch-shaped case 120 is pressed such that the pouch-shaped case 120 comes into tight contact with the electrode assembly 110, a concave-convex structure 150 is formed in the pouch-shaped case 120, as shown in FIG. 3.

FIG. 5 is a side view typically showing an internal structure of a battery cell 100' according to another embodiment of the battery cell 100 of FIG. 3.

Referring to FIG. 5 together with FIG. 3, the battery cell 100' according to the present invention is configured to have a structure in which an electrode assembly 110', including positive electrodes 111', negative electrodes 112', and separators 113' disposed respectively between the positive electrodes 111' and the negative electrodes 112', is mounted in a pouch-shaped case 120' in a state in which the electrode assembly 110' is impregnated with an electrolyte, and the uppermost end electrode and the lowermost end electrode of the electrode assembly 110' in the direction in which the electrodes are stacked are provided on electrode mixture layers (hereinafter, referred to as 'outermost electrode mixture layers') thereof, facing the inner surface of a pouch-shaped case 120', with coating parts 130', each of which includes inert particles 131'.

The coating parts 130', each of which includes inert particles 131', are formed on the outermost electrode mixture layers of the electrode assembly 110' such that the inert particles 131' are scattered on the outermost electrode mixture layers of the electrode assembly 110'.

The inert particles 131' may be fixed to the outermost electrode mixture layers by a binder included in each of the outermost electrode mixture layers.

Although not shown, a binder (not shown) may be further coated on the surface of each of the inert particles 131' such that the inert particles 131' can be further appropriately fixed to the outermost electrode mixture layers in a state in which the inert particles 131' are scattered on the outermost electrode mixture layers.

Since the inert particles 131' are regularly or irregularly scattered on the outermost electrode mixture layers of the electrode assembly 110', a concave-convex structure is formed in the outermost electrode mixture layers of the electrode assembly 110. When the electrode assembly 110' is mounted in the pouch-shaped case 120' and then the pouch-shaped case 120' is pressed such that the pouch-shaped case 120' comes into tight contact with the electrode assembly 110', therefore, a concave-convex structure 150 is formed in the pouch-shaped case 120, as shown in FIG. 3.

FIGS. 6 and 7, which correspond to FIG. 5, are side views typically showing battery cells 200 and 300 according to other embodiments of the present invention.

Referring first to FIG. 6, an electrode assembly 210 includes positive electrodes 211, negative electrodes 212, and separators 213 disposed respectively between the positive electrodes 211 and the negative electrodes 212, in the same manner as shown in FIG. 5. In addition, coating parts 230, each of which includes inert particles 231, are formed on the outermost electrode mixture layers in the direction in which the electrodes are stacked.

Unlike the structure shown in FIG. 5, however, each of the coating parts 230, each of which includes inert particles 231, includes a binder layer 232 formed on a corresponding one of the electrode mixture layers and inert particles 231 scattered on the binder layer 232.

That is, in comparison with the structure shown in FIG. 5, the inert particles 231 are not directly scattered on the outermost electrode mixture layers, but the binder layer 232 is formed on a corresponding one of the outermost electrode mixture layers and then the inert particles 231 are scattered on the binder layer 232 to form each of the coating parts 230 such that the inert particles 231 can be appropriately fixed to the outermost electrode mixture layers.

The thickness of the binder layer 232 is less than the size of the inert particles 231. As a result, the inert particles 231 are prevented from being submerged in the binder layer 232 or being buried in the binder layer 232, irrespective of the specific gravity of the inert particles 231. Consequently, a concave-convex structure may be formed in the outer surfaces of the outermost electrodes, whereby the concave-convex structure may also be formed in the outer surfaces of a pouch-shaped case 220, in which the electrode assembly is mounted.

Meanwhile, referring to FIG. 7, an electrode assembly 310 includes positive electrodes 311, negative electrodes 312, and separators 313 disposed respectively between the positive electrodes 311 and the negative electrodes 312, in the same manner as shown in FIG. 5. In addition, coating parts 330, each of which includes inert particles 331, are formed on the outermost electrode mixture layers in the direction in which the electrodes are stacked.

Unlike the structures shown in FIGS. 5 and 6, however, each of the coating parts 330, each of which includes inert particles 331, includes a mixture layer including inert particles 331 and a binder 332.

That is, the inert particles 331 and the binder 332 are mixed to form each of the coating parts 330 such that the inert particles 331 can be appropriately fixed to a corresponding one of the outermost electrode mixture layers, instead of using the inert particles having the binder coated thereon or additionally forming the binder layer, as described above.

In order to form a concave-convex structure in the outer surfaces of the outermost electrodes and in the outer surfaces of a pouch-shaped case 320, in which the electrode assembly is mounted, the specific gravity of the inert particles 331 is lower than the specific gravity of the mixture. As a result, the inert particles 331 are located on the surface of the mixture layer.

FIG. 8 is a side view typically showing a battery cell 400 according to a further embodiment of the present invention. The battery cell shown in FIG. 8 is different from the battery cell shown in FIG. 6 in that coating parts 430, each of which includes inert particles 431, are partially formed.

Referring to FIG. 8, the battery cell 400 shown in FIG. 7 is identical to the battery cell 200 shown in FIG. 5 in that each of the coating parts 430, each of which includes inert particles 431, includes a binder layer 432 formed on a corresponding one of the outermost electrode mixture layers and inert particles 431 scattered on the binder layer 432. However, the battery cell 400 shown in FIG. 7 is different from the battery cell 200 shown in FIG. 6 in that the coating parts 430, each of which includes inert particles 431, are partially formed on the middle portions of the outermost electrode mixture layers Of course, in this case, although not shown, a concave-convex structure is formed only in regions of a pouch-shaped case 420, in which the electrode assembly is mounted, corresponding to the coating parts 430, each of which includes inert particles 431.

As described above with reference to the drawings, the battery cell according to the present invention is configured to have a structure in which a concave-convex structure formed in the outer surfaces of the uppermost end electrode and the lowermost end electrode by the inert particles and the concave-convex structure is also formed in the outer surfaces of the variable cell case such that the surface area of the cell case is greater than the surface area of each of the electrodes. Even in a case in which the shape of the battery cell is deformed in response to devices having various kinds of designs, therefore, only the concave-convex structure is deformed, whereby it is possible to prevent unintentional wrinkles from being formed on the cell case. Consequently, it is possible to effectively prevent dielectric breakdown of the battery cell or leakage of the electrolyte from the battery cell due to the exposure of the metal layer which may be caused by damage to the cell case, thereby securing the safety of the battery cell.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery cell according to the present invention, which is a battery cell that can be flexibly deformed in response to the shape of a device, in which the battery cell is mounted, is configured such that an electrode having an electrode mixture including inert particles applied to an electrode current collector or an electrode having a coating part including inert particles formed on an electrode mixture layer is located at the uppermost end and/or the lowermost end of an electrode assembly, which faces the inner surface of a cell case. Even in a case in which the shape of the battery cell is deformed in response to devices having various kinds of designs, therefore, it is possible to prevent unintentional wrinkles from being formed on the cell case. Consequently, it is possible to effectively prevent dielectric breakdown of the battery cell or leakage of the electrolyte from the battery cell due to the exposure of the metal layer which may be caused by damage to the cell case, thereby securing the safety of the battery cell.

The invention claimed is:

1. A battery cell having an electrode assembly mounted in a variable cell case in a state in which the electrode assembly is impregnated with an electrolyte, the battery cell being configured to be flexibly deformed in response to a shape of a device, in which the battery cell is mounted, wherein
an uppermost end electrode and/or a lowermost end electrode of the electrode assembly in a direction in which electrodes are stacked is provided on an electrode current collector thereof, facing an inner surface of the cell case, with an electrode mixture comprising inert particles, 10 to 100% of the inert particles being distributed on a surface of the electrode mixture such that a concave-convex structure is formed in the surface of the electrode mixture in vertical section.

2. The battery cell according to claim 1, wherein the electrode mixture comprising inert particles is applied to the electrode current collector of each of the uppermost end electrode and the lowermost end electrode of the electrode assembly.

3. The battery cell according to claim 1, wherein the uppermost end electrode or the lowermost end electrode is manufactured by applying and drying an electrode slurry, comprising an electrode active material, a binder, and inert particles, to the electrode current collector thereof, facing the inner surface of the cell case.

4. The battery cell according to claim 3, wherein the electrode slurry has a viscosity of 500 to 40000 cps.

5. The battery cell according to claim 3, wherein a specific gravity of the inert particles is 30 to 95% of an overall specific gravity of the electrode slurry.

6. The battery cell according to claim 1, wherein each of the inert particles is a porous particle having pores formed therein.

7. The battery cell according to claim 1, wherein 50 to 90% of the inert particles are distributed on the surface of the electrode mixture such that the concave-convex structure is formed in the surface of the electrode mixture in vertical section.

8. A battery cell having an electrode assembly mounted in a variable cell case in a state in which the electrode assembly is impregnated with an electrolyte, the battery cell being configured to be flexibly deformed in response to a shape of a device, in which the battery cell is mounted, wherein
an uppermost end electrode and/or a lowermost end electrode of the electrode assembly in a direction in which electrodes are stacked is provided on an electrode mixture layer thereof, facing an inner surface of the cell case, with a coating part comprising inert particles such that a concave-convex structure is formed in the surface of the electrode mixture in vertical section.

9. The battery cell according to claim 8, wherein the coating part comprising inert particles is formed on each of the uppermost end electrode and the lowermost end electrode of the electrode assembly.

10. The battery cell according to claim 8, wherein the coating part comprising inert particles is partially or entirely formed on the electrode mixture layer.

11. The battery cell according to claim 8, wherein the coating part comprising inert particles is an inert particle layer comprising inert particles scattered on the electrode mixture layer.

12. The battery cell according to claim 8, wherein the coating part comprising inert particles comprises a binder layer formed on the electrode mixture layer and inert particles scattered on the binder layer.

13. The battery cell according to claim 12, wherein the binder layer has a thickness less than a size of each of the inert particles.

14. The battery cell according to claim 13, wherein the thickness of the binder layer is 10 to 95% of the size of each of the inert particles.

15. The battery cell according to claim 8, wherein the coating part comprising inert particles is a mixture layer comprising inert particles and a binder.

16. The battery cell according to claim 15, wherein the mixture layer has a thickness of 1 to 150 micrometers.

17. The battery cell according to claim 15, wherein a specific gravity of the inert particles is 30 to 90% of an overall specific gravity of the coating part.

18. The battery cell according to claim 8, wherein each of the inert particles is a porous particle having pores formed therein.

19. The battery cell according to claim 1, wherein each of the inert particles is an organic particle and/or an inorganic particle.

20. The battery cell according to claim 19, wherein each of the inert particles is an organic particle.

21. The battery cell according to claim 19, wherein the organic particle is made of a polymer or a silane-based compound.

22. The battery cell according to claim 19, wherein the organic particle is one or a mixture of two or more selected from a group consisting of $SiO_2$, $Al_2O_3$, $MgO$, $TiO_2$, $ZrO_2$, $CaO$, $Y_2O_3$, and $SrO$.

23. The battery cell according to claim 1, wherein each of the inert particles has a size of 5 to 1000 micrometers.

24. The battery cell according to claim 1, wherein each of the inert particles is configured to have a spherical shape, an oval shape, or a polyhedral shape.

25. The battery cell according to claim 1, wherein the cell case is a pouch-shaped case made of a laminate sheet comprising a resin layer and a metal layer.

26. The battery cell according to claim 1, wherein the cell case has a concave-convex structure formed by the inert particles.

27. The battery cell according to claim 1, wherein the electrode assembly is a stacked type electrode assembly, configured to have a structure in which positive electrodes and negative electrodes, each of which has a predetermined size, are sequentially stacked in a state in which separators are disposed respectively between the positive electrodes and the negative electrodes, a stacked/folded type electrode assembly, configured to have a structure in which positive electrodes and negative electrodes, each of which has a predetermined size, are sequentially stacked in a state in which separators are disposed respectively between the positive electrodes and the negative electrodes to constitute a bi-cell or a full cell and then bi-cells or full cells are folded using a separation film, or a laminated/stacked type electrode assembly, configured to have a structure in which bi-cells or full cells are stacked in a state in which separators are disposed respectively between the bi-cells or the full cells.

28. A method of manufacturing a battery cell according to claim 1, the method comprising:
(a) applying and drying an electrode slurry comprising inert particles to one major surface of an electrode current collector and applying and drying an electrode slurry comprising no inert particles to the other major surface of an electrode current collector to prepare one or two outermost electrodes;
(b) applying and drying an electrode slurry comprising no inert particles to opposite major surfaces of an electrode current collector to prepare middle electrodes;
(c) locating the outermost electrodes at an uppermost end and/or a lowermost end of an electrode assembly such that an electrode mixture, comprising the inert particles, of each of the outermost electrodes faces an inner surface of a cell case in a state in which the middle electrodes are disposed between the uppermost end and the lowermost end of an electrode assembly or in a state in which the middle electrodes are not disposed between the uppermost end and the lowermost end of an electrode assembly to constitute the electrode assembly; and
(d) placing the electrode assembly in a receiving part of a variable cell case and pressing the cell case such that the cell case comes into tight contact with the electrode assembly.

29. The method according to claim 28, wherein the electrode assembly is configured by the outermost electrodes and the middle electrodes.

30. A method of manufacturing a battery cell according to claim 8, the method comprising:
(a) applying and drying an electrode mixture to an electrode current collector to prepare a plurality of electrodes;
(b) selecting one or two electrodes from among the prepared electrodes and forming a coating part comprising inert particles on one major surface of an electrode mixture layer of each of the selected electrodes;
(c) locating the one or two electrodes, on one major surface of the electrode mixture layer of each of which the coating part comprising inert particles is formed, at an uppermost end and/or a lowermost end of an electrode assembly such that the coating part faces an inner surface of a cell case to constitute the electrode assembly; and
(d) placing the electrode assembly in a receiving part of a variable cell case and pressing the cell case such that the cell case comes into tight contact with the electrode assembly.

31. A battery pack comprising two or more battery cells according to claim 1.

32. A device comprising a battery pack according to claim 31 as a power source.

33. The device according to claim 32, wherein the device is selected from a group consisting of a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage apparatus.

* * * * *